United States Patent
Yoshino et al.

(10) Patent No.: US 8,199,818 B2
(45) Date of Patent: Jun. 12, 2012

(54) INTRA PREDICTION SYSTEM OF VIDEO ENCODER AND VIDEO DECODER

(75) Inventors: Tomonobu Yoshino, Saitama (JP); Sei Naito, Saitama (JP); Atsushi Koike, Saitama (JP)

(73) Assignee: KDDI R & D Laboratories Inc., Saitama (JP)

( * ) Notice: Subject to any disclaimer, the term of this patent is extended or adjusted under 35 U.S.C. 154(b) by 1114 days.

(21) Appl. No.: 12/054,756

(22) Filed: Mar. 25, 2008

(65) Prior Publication Data

US 2008/0240238 A1  Oct. 2, 2008

(30) Foreign Application Priority Data

Mar. 28, 2007  (JP) .................................. 2007-085149

(51) Int. Cl.
*H04B 1/66* (2006.01)

(52) U.S. Cl. ......... 375/240.12; 375/240.24; 375/240.18; 375/240.02; 348/403.1; 348/699; 382/233; 382/238; 386/95; 386/11

(58) Field of Classification Search ............. 375/240.12, 375/240.24, 240.18, 240.02, 240.11, 240.13, 375/240.14, 240.15; 348/403.1, 699; 382/233, 382/238; 386/95, 111
See application file for complete search history.

(56) References Cited

U.S. PATENT DOCUMENTS

| | | | |
|---|---|---|---|
| 6,275,533 B1 * | 8/2001 | Nishi | 375/240.24 |
| 2005/0281337 A1 * | 12/2005 | Kobayashi et al. | 375/240.18 |
| 2006/0098881 A1 * | 5/2006 | Kim | 382/238 |

FOREIGN PATENT DOCUMENTS

JP  2005/107267  11/2005
JP  2006-217158  8/2006

OTHER PUBLICATIONS

Office Action from corresponding Japanese Patent Application No. 2007-085149, 2 pages.
"A Pixel-Based Adaptive Intra Prediction", by A. Tanizawa et al., *ITE Annual Convention*, 2006, 3 pgs.
"A study on Improved Intra Prediction Using Multiple Reference Lines", by S. Matsuo et al., *IPSJ SIG Technical Report*, Mar. 6, 2007, pp. 37-42.

* cited by examiner

*Primary Examiner* — Andrew Chriss
*Assistant Examiner* — Jamal Javaid
(74) *Attorney, Agent, or Firm* — Westman, Shamplin & Kelly, P.a.

(57) ABSTRACT

There is provided an intra prediction system having high prediction performance and satisfactory encoding efficiency in a pattern image in which pixel value is periodically changed and a pattern image in which pixel value has a constant change tendency like gradation effect. A frequency component extraction unit allows a pixel value of an encoded MB to be made one-dimensional for one-dimensional orthogonal conversion. A frequency component-considering prediction value calculation unit receives, as inputs, a pixel value of an encoded adjacent MB and an alternating current frequency component output to create an orthogonal conversion coefficient. The orthogonal conversion coefficient then is subjected inverted orthogonal conversion (IDCT) to generate a prediction value p(i). A prediction direction determination unit selects and outputs a prediction value p'(i) in a prediction direction having the highest encoding efficiency among a conventional prediction value calculation unit and a prediction value calculation unit according to the present invention.

6 Claims, 8 Drawing Sheets

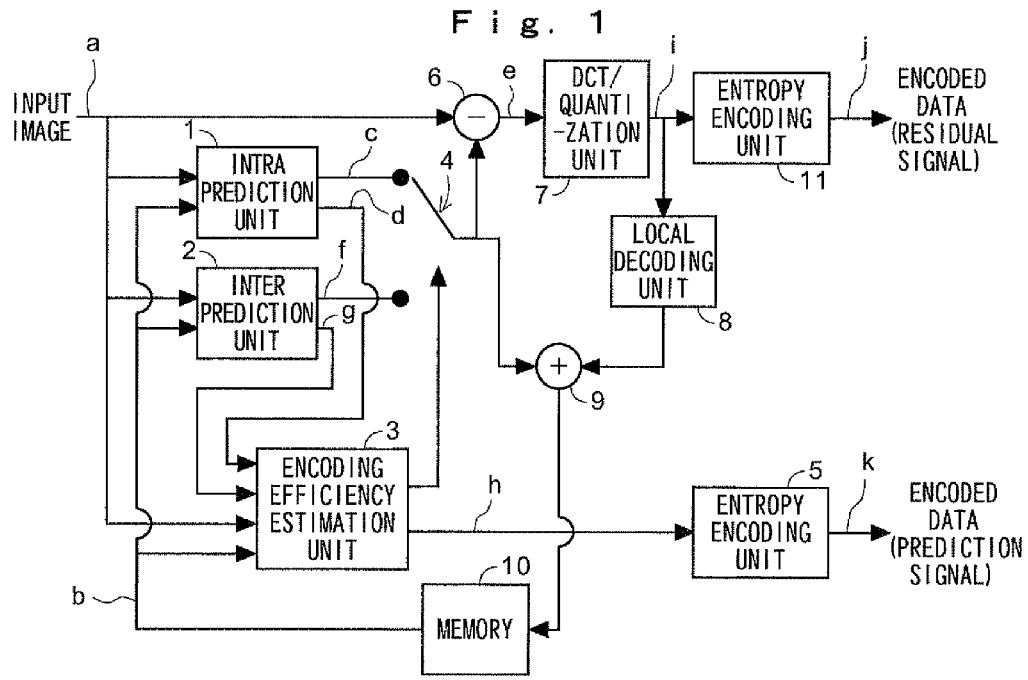
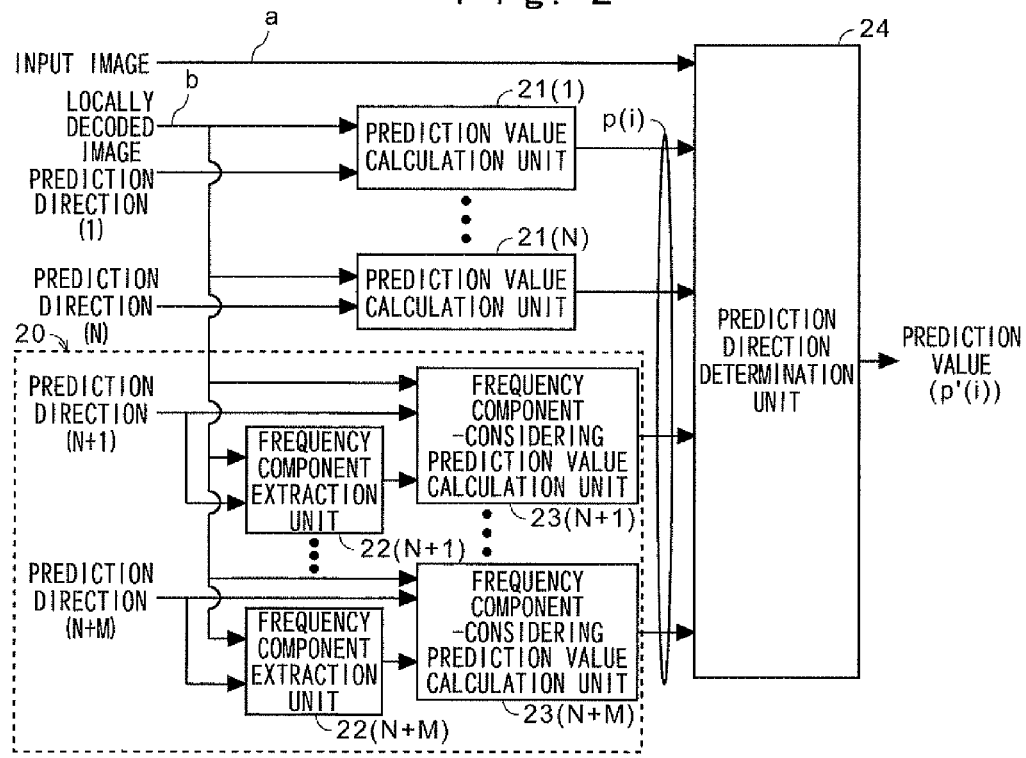

(INTRA PREDICTION METHOD IN INTRA 4×4 ENCODING MODE)

(INTRA PREDICTION METHOD IN INTRA 8×8 ENCODING MODE)

(INTRA 4×4 ENCODING MODE)

(INTRA 8×8 ENCODING MODE)

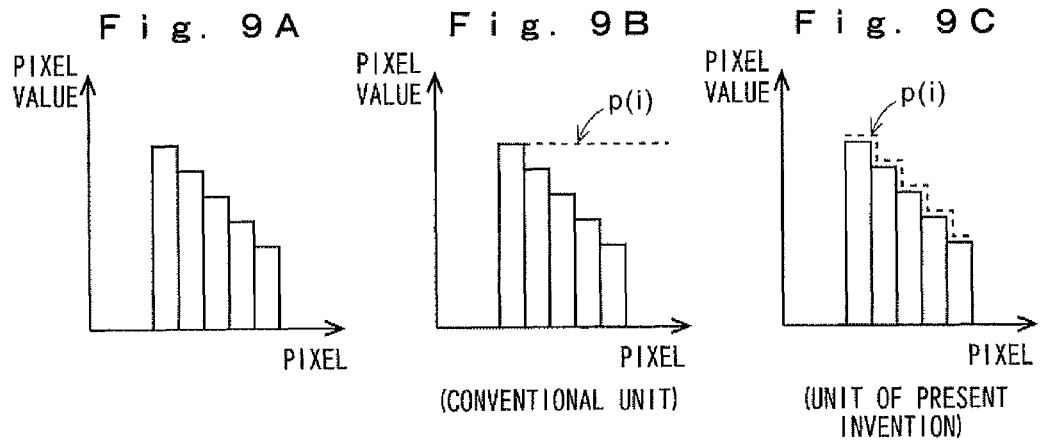
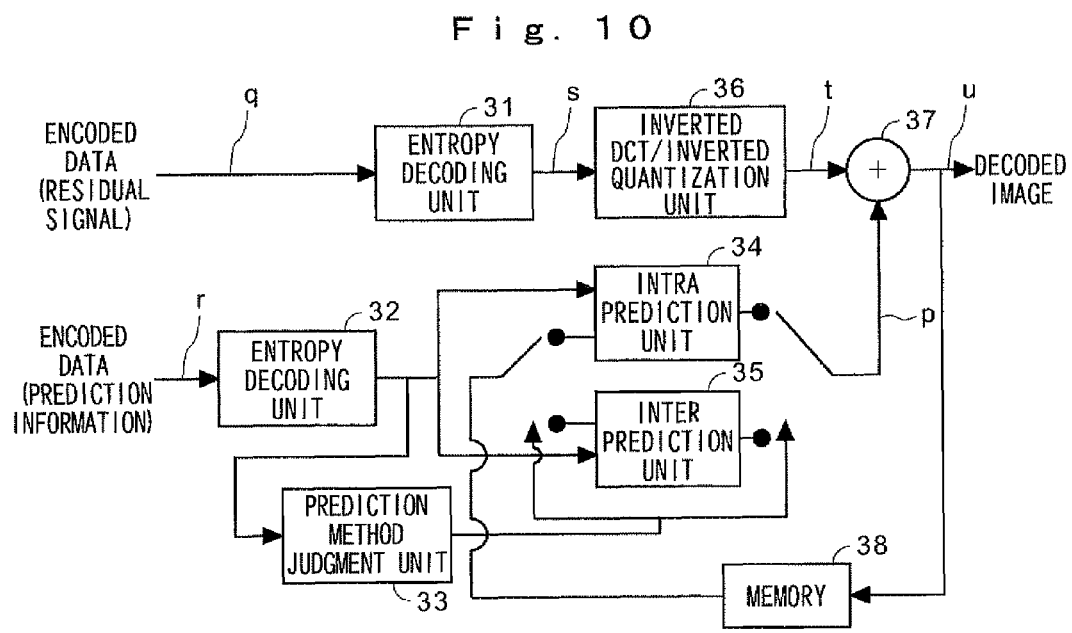

Fig. 13
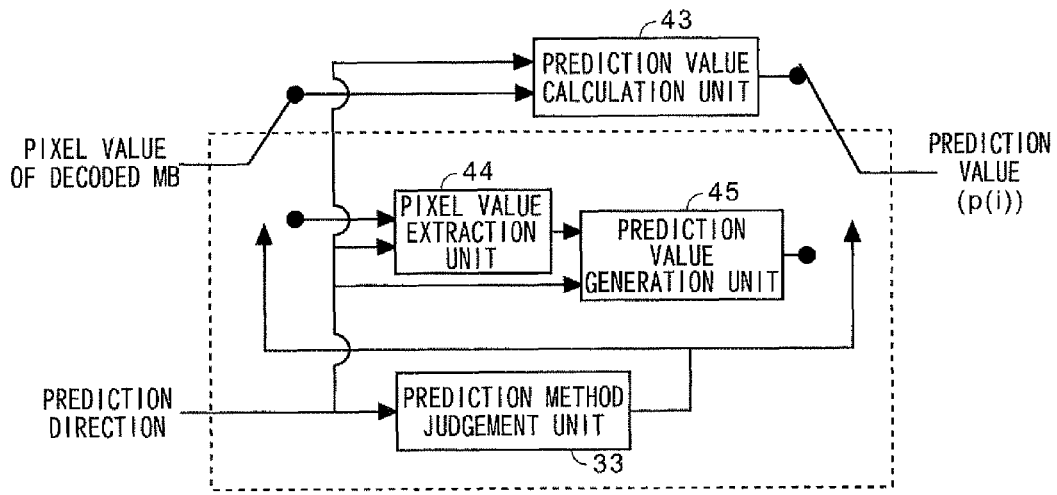
Fig. 14
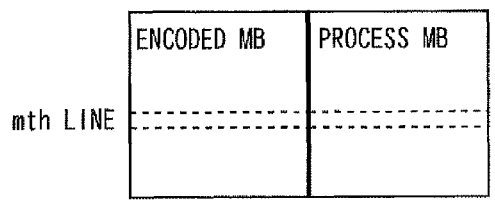
Fig. 15A  Fig. 15B  Fig. 15C
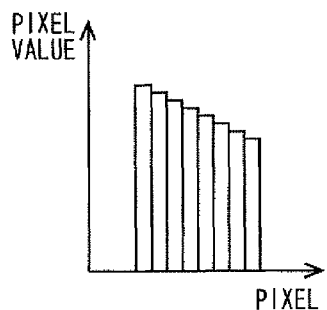 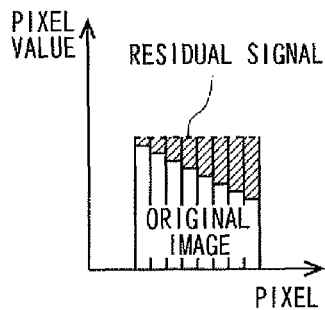 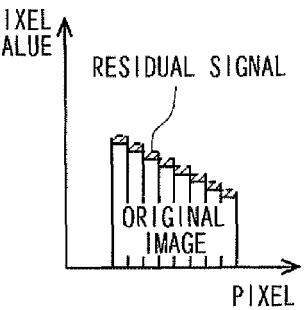
(PIXEL VALUES IN ENCODED MB)  (CONVENTIONAL METHOD)  (METHOD OF PRESENT INVENTION)

(PIXEL VALUES IN ENCODED MB)

(CONVENTIONAL METHOD)

(METHOD OF PRESENT INVENTION)

INTRA PREDICTION SYSTEM OF VIDEO ENCODER AND VIDEO DECODER

The present application claims priority of Japanese patent application Serial No. 2007-085149, filed Mar. 28, 2007, the content of which is hereby incorporated by reference in its entirety.

BACKGROUND OF THE INVENTION

1. Field of the Invention

The present invention relates to an intra prediction system using a pixel value of an encoded adjacent pixel as a prediction value in a video encoder and a video decoder which allow intra encoding when each macro block (hereinafter, called MB) in a screen is encoded.

2. Description of the Related Art

In a video encoder which allows intra encoding as a encoding selection when a screen is divided into MBs in encoding to encode each of the MBs, pixel values of an encoded adjacent MB are arranged for prediction values of intra encoding of a process MB in a direction suitable for the feature of an image, thereby obtaining high prediction performance. When identical pixel values are arranged in a fixed direction, however, as the pixels are farther from prediction values, the prediction performance becomes lower. Also, in a pattern causing periodic texture, when a certain pixel value is used as a prediction value, high prediction performance cannot be obtained.

In an image representing shading by illuminating an object with a light source and gradation effect, for example, pixel values near a fixed direction are arranged, but they change at a fixed frequency. Therefore, when identical pixel values are arranged along the direction, as the pixels are farther from pixels used as prediction values, prediction performance becomes lower, resulting in reduction of encoding efficiency.

Japanese Patent Application Laid-Open (JP-A) No. 2006-217158, Yazawa et al., "Prediction in pixel-adaptive screen corresponding to the distance of reference pixel" (hereinafter, "document 1"), Annual Conference of The Institute of Image Information and Television Engineers 2006, 13-2, Aug. 2006 and Matsuo et al. (hereinafter, "document 2"), "Study of intra prediction improving method using peripheral adjacent pixel", research report by Information Processing Society of Japan, 2007-AVM-56 pp. 37-42, March 2007 (hereinafter, "document 3") disclose such technique.

In the disclosure of the document 1, in order to improve the performance of intra prediction in a frame in the conventional intraprediction direction, the intraprediction direction applied to each MB belonging to a process frame is controlled based on the feature (pan, tilt, zoom, and blur) of an image.

In the disclosure of the document 2, in order to improve intra prediction performance, when a prediction value of a certain pixel value is generated in intra prediction, prediction values of a plurality of adjacent pixels are used. When a prediction value is generated, prediction values of pixels close thereto are used, thereby solving the problem that farther pixels lower prediction performance.

The document 3 discloses an intra prediction performance improving method according to a method of using pixel values near a process MB as prediction values in intra prediction. In the conventional art, only values of pixels close to a process MB are used as prediction values. In this document 3, values of pixels far from the process MB are also used as prediction values of pixels along a predetermined prediction direction.

The invention described in the document 1 is effective for an image obtaining high prediction performance when identical pixel values are used as prediction values. In an image with a pattern in which pixel values are periodically changed, there are concerns that prediction performance is lowered to reduce encoding efficiency.

The invention described in the document 2 generates a prediction value based on pixel values or prediction values of encoded adjacent or predicted pixels. The prediction value can be represented by computation for the locally decoded result of the pixels adjacent to a process MB. Since texture along the prediction directions is not considered, however, in a pattern in which pixel values have a constant change tendency like gradation effect, as pixels are farther from pixels adjacent to the process MB as a source of the prediction values, prediction performance becomes significantly lower. Similarly, an appropriate prediction value cannot be generated in a pattern having periodic texture.

The invention described in the document 3 is a method of allowing pixel values far from a process MB to be used as prediction values. After the pixel values used as prediction values are determined, identical prediction values are set according to a fixed direction as in the conventional art. In a pattern in which pixel values have a constant change tendency like gradation effect, pixels are farther from pixel values used as prediction values, prediction performance becomes lower. Since the identical prediction values are used according to the fixed direction, a prediction value suitable for periodic texture cannot be generated.

SUMMARY OF THE INVENTION

An object of the present invention is to provide an intra prediction system of a video encoder and a video decoder which have high prediction performance and satisfactory encoding efficiency in an image in a pattern in which a pixel value is periodically changed and an image in a pattern in which a pixel value has a constant change tendency like gradation effect.

In order to attain the object, a feature of the present invention resides in that an intra prediction system of a video encoder which allows intra (intra-screen) encoding when each MB is encoded comprises a frequency component extraction unit for extracting a frequency component on a pixel value of an encoded adjacent ME according to a prediction direction, and a frequency component-considering prediction value calculation unit for considering the frequency component to generate a prediction value in a process ME, wherein a value considering frequency characteristic of the pixel value in the encoded adjacent MB is generated as a prediction value in the intra encoding.

Another feature of the invention resides in that an intra prediction system of a video decoder which decodes encoded data generated by the video encoder according to claim 1 comprises a prediction method judgment unit for detecting information on an intra prediction direction included in the encoded data, a prediction direction controlling unit for determining a prediction value calculation method according to a prediction direction detected by the prediction method judgment unit, a frequency component extraction unit for extracting a frequency component on a pixel value of a decoded adjacent MB, and a frequency component-considering prediction value calculation unit for considering the frequency component to generate a prediction value of a pixel value in a process MB.

According to the intra prediction of the present invention, a prediction value having a residual signal smaller than that of the conventional intra prediction can be obtained. Encoded data having less encoding distortion and a small amount of encoding can be obtained, contributing to improvement of encoding efficiency. In particular, a prediction value having a smaller residual signal can be obtained in an image in a pattern in which a pixel value is periodically changed and an image in a pattern in which a pixel value has a constant change tendency like gradation effect.

BRIEF DESCRIPTION OF THE DRAWINGS

FIG. 1 is a block diagram showing a configuration example of an encoder to which the present invention is applied;

FIG. 2 is a block diagram showing the configuration of an intra prediction unit of an embodiment of the present invention;

FIGS. 9A to 9C are diagrams showing a prediction value p(i) obtained from the intra prediction unit of this embodiment and a prediction value p(i) obtained from a conventional intra prediction unit;

FIG. 10 is a block diagram showing a configuration example of a decoder to which the present invention is applied;

FIG. 13 is a block diagram showing the configuration of the intra prediction unit in the decoder of another embodiment of the present invention;

FIG. 14 is a conceptual diagram of prediction of an encoded MB and a process MB in a horizontal direction;

FIGS. 15A to 15C are explanatory views of a conventional method and a method according to the present invention of residual signals in a pattern including gradation representation.

DETAILED DESCRIPTION OF THE PREFERRED EMBODIMENTS

Figure 3:
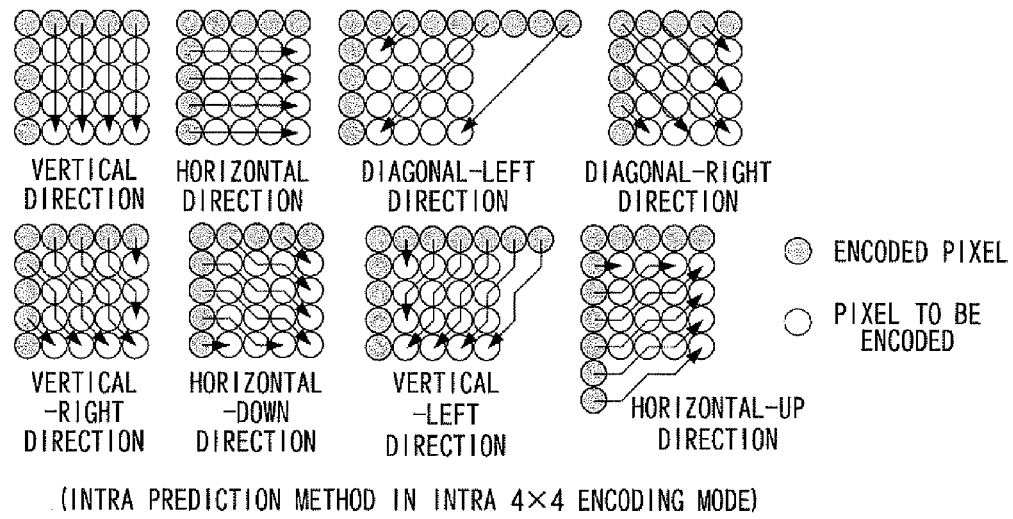
FIG. 3 is an explanatory view of intra prediction directions in intra 4×4 encoding mode.

The schematic configuration and operation of an encoder to which the present invention is applied will be described. As a best embodiment, in the description below, although the present invention is applied to a reference encoder of H.264 encoding as a video encoder which allows intra (intra-screen) encoding when each MB is encoded, the present invention is not limited to this and can be used for a well-known JM encoder or JSVM encoder.

FIG. 1 shows a block diagram of a reference encoder. An encode process is largely divided into three processes: a prediction value generating process, a residual signal encoding process, and a local decoding process.

The prediction value generating process includes an intra prediction unit 1, an inter prediction unit 2, and an encoding efficiency estimation unit 3. The intraprediction unit 1 receives, as inputs, an input image (a) and a locally decoded image (b) of encoded data, determines a divided block size and a prediction direction in which encoding efficiency is optimum from candidate prediction directions, and outputs a prediction value (c) and prediction information (d) (information on the divided block size and the prediction direction). The prediction value c is used for determining a residual signal (e). The prediction information (d) is input to the encoding efficiency estimation unit 3. As in the intraprediction unit 1, the interprediction unit 2 receives, as inputs, the input image (a) and the locally decoded image (b) of encoded data, determines a divided block size and a motion vector in which encoding efficiency is optimum, and outputs a prediction value (f) and prediction information (g) (information on the divided block size and the motion vector). The prediction value (f) is used for determining the residual signal (e). The prediction information (g) is input to the encoding efficiency estimation unit 3. The encoding efficiency estimation unit 3 receives, as inputs, prediction information in intra prediction and inter prediction, the input image, and the locally decoded image, and estimates encoding efficiency of both the predictions in a process MB. The encoding efficiency estimation unit 3 controls a switch 4 so that the prediction value (c) or (f) of the prediction which is judged to have higher encoding efficiency is used for residual signal calculation and inputs prediction information (h) on the prediction into an entropy encoding unit 5.

The residual signal encoding process includes a subtraction unit 6 for determining the difference between the input image (a) and a prediction value, and a DCT/quantization unit 7 for performing DCT computation and quantizing a DCT coefficient. The subtraction unit 6 subjects the input image (a) to a subtraction process by the prediction value (c) or (f) according to intra prediction or interprediction and inputs the subtracted result (residual signal) to the DCT/quantization unit 7. The DCT/quantization unit 7 subjects the residual signal (e) to DCT computation, subjects the DCT coefficient obtained as the computed result to a quantizing process, and outputs a quantized DCT coefficient i.

The local decoding process includes a local decoding unit 8, an addition unit 9 of a residual signal decoded result and a prediction value, and a memory 10 for stacking a locally decoded image. The local decoding unit 8 subjects the quantized DCT coefficient to an inverted quantizing process, subjects the inverted quantized DCT coefficient to inverted DCT computation, and outputs the computed result. The addition unit 9 subjects the inverted DCT computed result to an adding process by the prediction value (c) or (f) according to intra prediction or inter prediction, and outputs the added result (locally decoded image) The memory 10 temporarily stacks the locally decoded result.

The DCT coefficient (i) of the residual signal and the prediction information (h) are entropy-encoded by entropy encoding units 11 and 5 and are generated as encoded data (j) and (k) respectively.

An intra prediction method of an embodiment of the present invention will be described. In this embodiment, for intra encoding, the intra prediction unit 1 generates a frequency component-considering intraprediction value in an adjacent region. The configuration of the intra prediction unit 1 will be described with reference to FIG. 2. Encoding of blocks having 4×4 pixels and 8×8 pixels will be described below. The present invention is not limited to this and is applicable to a block having 16×16 pixels.

Figure 4:
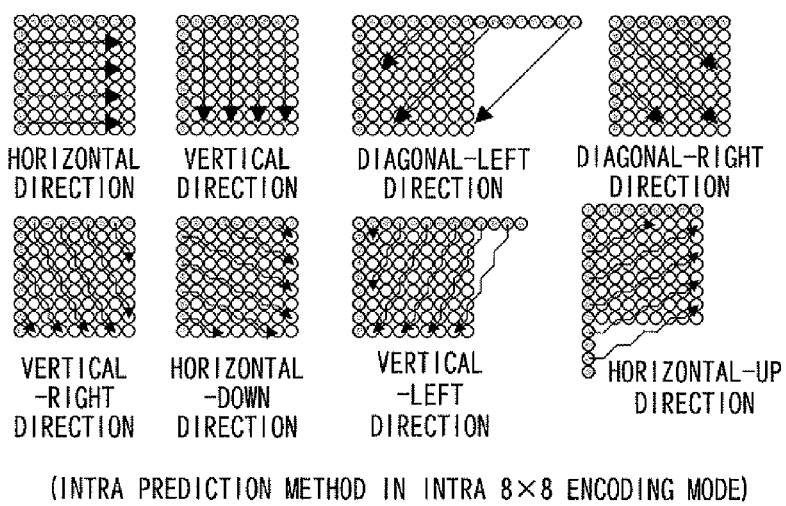
FIG. 4 is an explanatory view of intra prediction directions in intra 8×8 encoding mode.

In the drawing, prediction value calculation units 21(1) to 21(N) are used in the conventional art and, as shown in FIGS. 3 and 4, perform intra prediction in vertical, horizontal, diagonal-left, diagonal-right, vertical-right, horizontal-down, vertical-left, and horizontal-up directions. In FIGS. 3 and 4, a blackened circle indicates an encoded pixel and a blank circle indicates a pixel to be encoded. The prediction value calculation units 21(1) to 21(N) output prediction values p(i) obtained by intra prediction in the directions.

FIGS. 3 and 4 show examples of the prediction directions, which is not limited to this. In this embodiment, a pixel value array can be made one-dimensional in an arbitrary divided block size and an arbitrary prediction direction without depending on a specified divided block size and a specified prediction direction.

In FIG. 2, a prediction value calculation unit 20 according to the present invention includes frequency component extraction units 22 (N+1) to 22 (N+M) (hereinafter, abbreviated as a frequency component extraction unit 22), and frequency component-considering prediction value calculation units 23 (N+1) to 23(N+M) (hereinafter, abbreviated as a prediction value calculation unit 23).

The frequency component extraction unit 22 has, as inputs, a pixel value of an encoded adjacent MB and a predetermined prediction direction. The number of pixel values of the encoded adjacent MB is equal to the number of pixels to be encoded in the prediction direction. The pixel values of the encoded MB are made a one-dimensional numerical value array according to the prediction direction to determine an alternating current frequency component in the numerical value array by orthogonal conversion. The frequency component extraction unit 22 outputs a coefficient value array of the alternating current frequency component.

Here, a one-dimensional prediction value array generated along a certain prediction direction is called (P), and a pixel value array in which a pixel value decoding encoded data is allowed to be made one-dimensional along the prediction direction is called (X). The number of pixels N included in (P) is uniquely determined according to a prediction method and the position of a pixel corresponding to the head along a prediction direction in a divided block. Here, (X) includes encoded pixels which are equal in number to that of the pixels N included in (P) from the nearest encoded pixel along a prediction direction. This makes the conditions of frequency calculation from an image to be encoded and frequency component extraction from an encoded pixel equal to each other.

Figure 5:
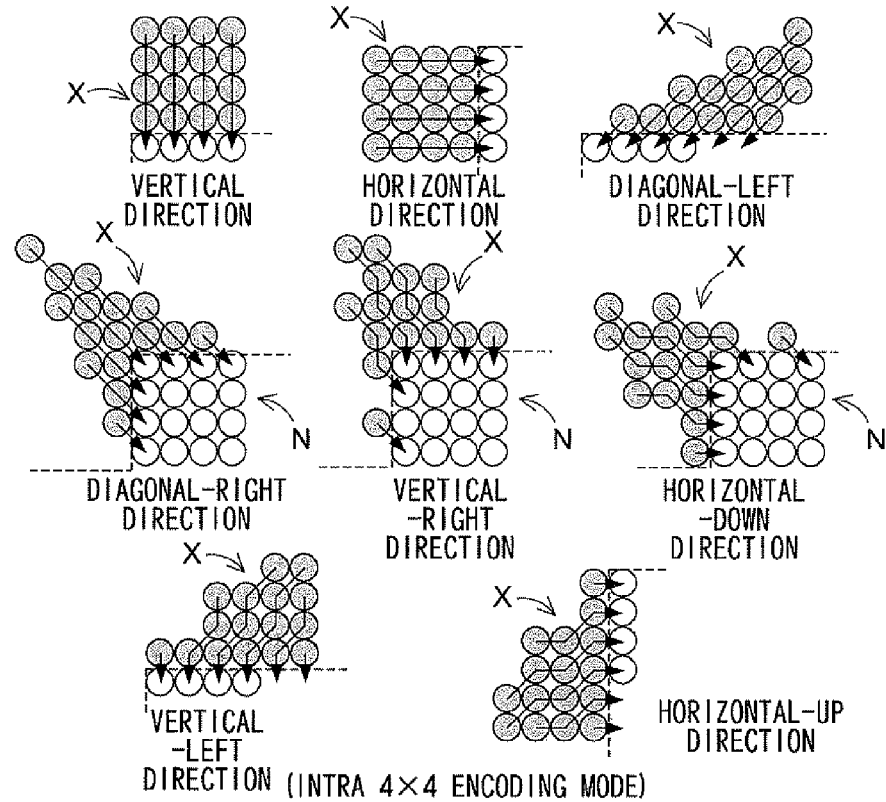
FIG. 5 is an explanatory view of prediction directions in intra 4×4 encoding mode and pixel value arrays X of decoded data for encoded data which are made one-dimensional along the prediction methods.
Figure 6:
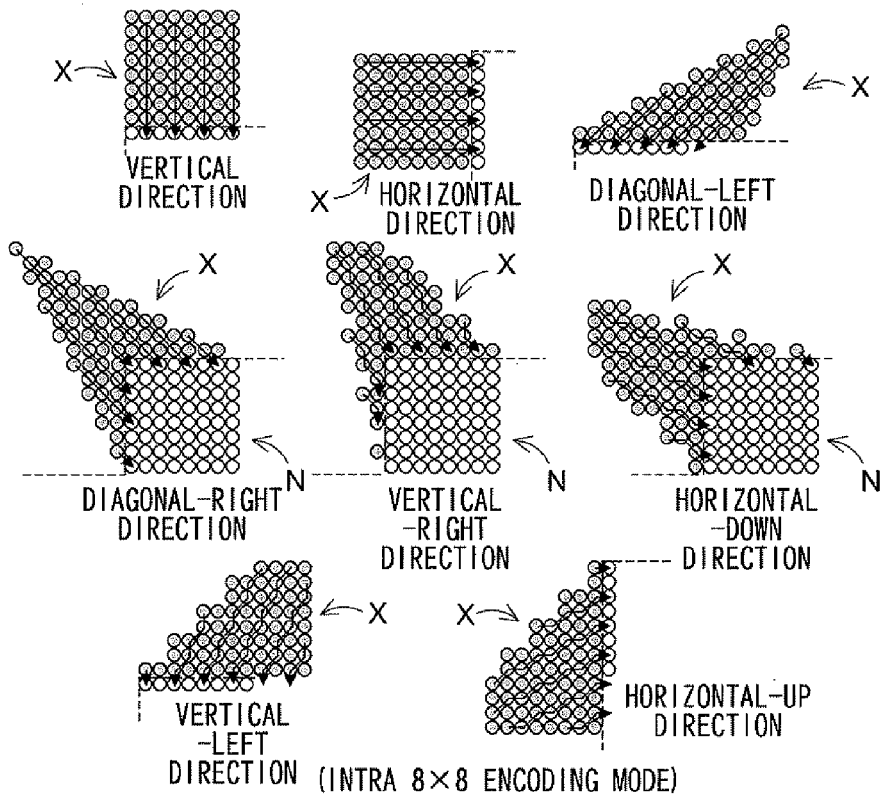
FIG. 6 is an explanatory view of prediction directions in intra 8×8 encoding mode and pixel value arrays X of decoded data for encoded data which are made one-dimensional along the prediction methods.

FIGS. 5 and 6 show scan orders of pixels corresponding to (X) in prediction directions and the number of encoded pixels frequency-extracted in intra 4×4 encoding mode and intra 8×8 encoding mode. In the drawings, encoded pixels referred for prediction value generation are noted and part of pixels to be encoded is omitted. Intra 16×16 encoding mode is the same as FIGS. 5 and 6 and its illustration is omitted. A combination of the number of pixels used for performing prediction and the number of pixels generated as prediction is arbitrary and is determined according to a conversion method for determining a frequency component.

In the "vertical direction" and the "horizontal direction" of FIG. 5, (X) includes four pixels along a prediction direction indicated by an arrow. In the "diagonal-right direction", (X) includes one pixel, two pixels, three pixels, four pixels, three pixels, two pixels, and one pixel along a prediction direction indicated by an arrow. As illustrated, this is similar for other encoding modes of FIG. 5 and intra 8×8 encoding mode of FIG. 6.

The process of the frequency component extraction unit 22 will be described with reference to FIGS. 7 and 8. The frequency component extraction unit 22 performs the processes of steps S1 and S2 of FIG. 7. In step S1, a pixel value of an encoded MB is allowed to be made one-dimensional. As shown in FIG. 8, the encoded pixels (X) are allowed to be made one-dimensional: X(0), X(1), X(2), and X(3). In step S2, they are subjected to one-dimensional orthogonal conversion (DCT). By the one-dimensional orthogonal conversion, DCT coefficients t(0), t(1), t(2), and t(3) are obtained. Here, the DCT coefficient t(0) is a DC component and the DCT coefficients t(1), t(2), and t(3) are AC components.

The frequency component-considering prediction value calculation unit 23 receives, as inputs, a pixel value of an encoded adjacent MB (in FIG. 8, X(3)), one of predetermined prediction directions, and alternating current frequency components (in FIG. 8, t(1), t(2), and t(3)) output from the frequency component extraction unit 22. The prediction direction input to the frequency component-considering prediction value calculation unit 23 and the prediction direction input to the frequency component extraction unit 22 are the same.

Figure 7:
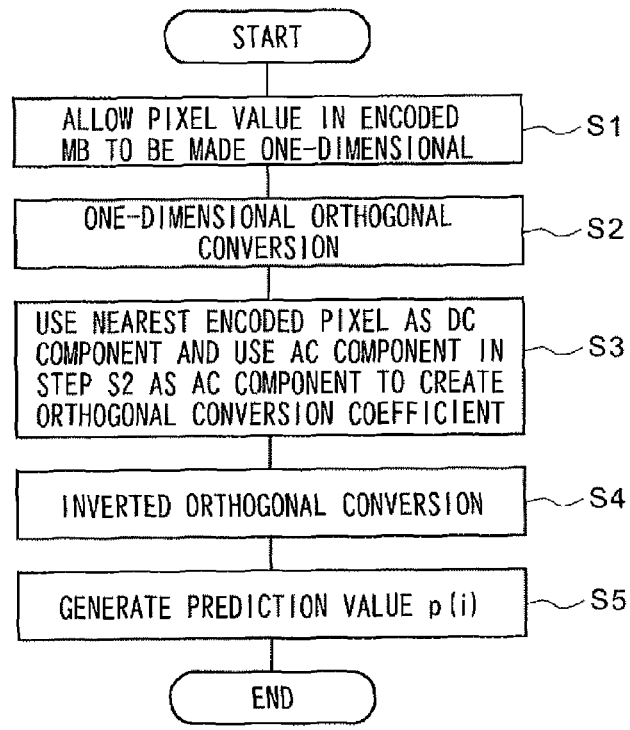
FIG. 7 is a flowchart in explaining the operation of a frequency component extraction unit and a frequency component-considering prediction value calculation unit of FIG. 2.
Figure 8:
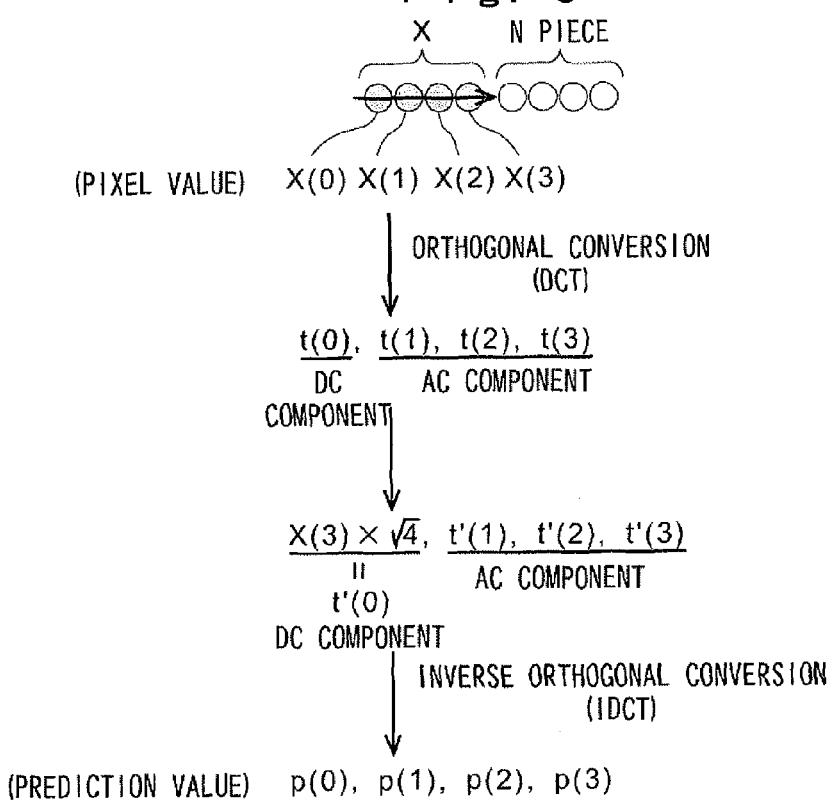
FIG. 8 is an explanatory view of the operation of the frequency component extraction unit and the frequency component-considering prediction value calculation unit of FIG. 2.

The prediction value calculation unit 23 performs the processes of steps S3 to S5 of FIG. 7. In step S3, the pixel value of the encoded pixel adjacent to a process MB (in FIG. 8, X(3)) corresponds to a DC component, the alternating current frequency components (in FIG. 8, t(1), t(2), and t(3)) input from the frequency component extraction unit 22 corresponds to AC components, and an orthogonal conversion coefficient is created by their components. In the example of FIG. 8, an orthogonal conversion coefficient in which X(3)×√N (=X(3)×√4) corresponds to a DC component and t'(1), t'(2), and t'(3) (=t(1), t(2), and t(3)) corresponds to AC components is created. The routine is advanced to step S4 to perform inverted orthogonal conversion (IDCT). In step S5, the prediction value p(i) is generated. In the example of FIG. 8, four prediction values p(0), p(1), p(2), and p(3) are generated.

The prediction value calculation unit 23 generates the prediction values p(i) of all pixels in a process MB by the same procedure described above to output the prediction value p(i). A value based on one or more pixel values included in X can be used as a DC component. By way of example, a value based on an average value of all elements included in X is used as a DC component so that the pixel value array X is applicable as the prediction value array p(i). The detail will be described later with reference to FIGS. 12 and 13.

As the pixel value, a brightness value, color difference, or R, G and B (red, green, and blue) signals are applicable. Any signal can be subjected to the same process.

The prediction direction determination unit 24 receives, as inputs, prediction values from the conventional prediction value calculation units 21(1) to 21(N) and the prediction value calculation unit 20 according to the present invention, and determines the difference between the prediction value p(i) and a pixel value of the original image (a) to generate a residual signal. Encoding efficiency in each prediction direction is estimated from the amount of encoding of the prediction value p(i) and the magnitude of the residual signal to output a prediction value p'(i) in the prediction direction having the highest encoding efficiency as a prediction value of intra encoding in a process MB. As the method of estimating encoding efficiency from the amount of encoding and a residual signal to determine a prediction direction having good encoding efficiency, the existing technique is used.

According to this embodiment, with respect to a pixel having a pixel value as shown in FIG. 9A, in the conventional method, the prediction value p(i) is the nearest pixel value (the magnitude is fixed) of a process MB (see FIG. 9B) whereas as shown in FIG. 9C, the prediction value p(i) having a magnitude corresponding to each pixel determined according to a frequency in a pixel value array is set.

A configuration example of a decoder to which the present invention is applied will be described with reference to FIG. 10. FIG. 10 shows a block diagram of the decoder.

A residual signal (q) and prediction information (r) included in encoded data are entropy-decoded by entropy decoding units 31 and 32 and are then subjected to a decode process. The decode process is largely divided into three: a prediction value decoding process, a residual signal decoding process, and an image decoding process.

The prediction value decoding process is performed by a prediction method judgment unit 33, an intra prediction unit 34, and an inter prediction unit 35. The prediction method judgment unit 33 judges, based on prediction information, which of intra prediction method and inter prediction is used to generate a prediction value (p). The intra prediction unit 34 receives, as inputs, prediction information and a decoded image, performs intra prediction according to a divided block size and a prediction direction included in the prediction information, and outputs the prediction value (p) As in the intra prediction unit 34, the inter prediction unit 35 receives, as inputs, prediction information and a decoded image, performs inter prediction according to a divided block size and a motion vector included in the prediction information, and outputs the prediction value (p).

The residual signal decoding process is performed by an inverted DCT/inverted quantization unit 36. The inverted DCT/inverted quantization unit 36 receives, as an input, a quantized DCT coefficient (s), subjects the coefficient (s) to an inverted quantizing process, subjects the processed result to inverted DCT computation, and outputs a computed result (decoded residual signal) (t).

The image decoding process is performed by an addition unit 37 for adding the decoded residual signal (t) and the prediction value (p) and a memory 38. The addition unit 37 adds the decoded residual signal (t) to the prediction value (p) generated by intra prediction or inter prediction to obtain a decoded image (u). The decoded image (u) is an output of the decoder, is stacked onto the memory 38, and is used for the decoding process for the following MBs.

Figure 11:
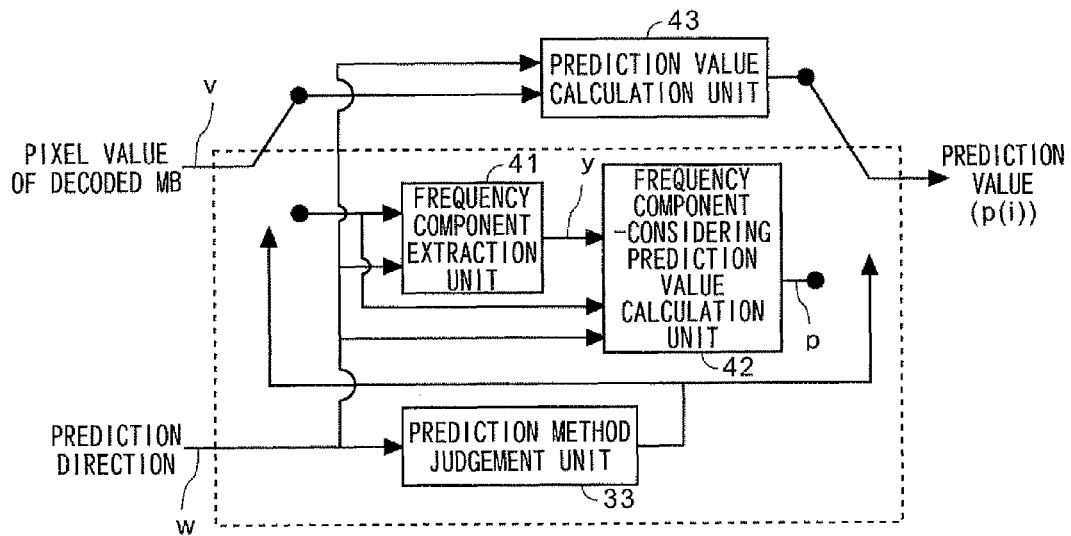
FIG. 11 is a block diagram showing the configuration of an intra prediction unit in the decoder of an embodiment of the present invention.

An embodiment of the intra prediction unit 34 for decoding an image encoded by intra prediction according to the present invention will be described with reference to FIG. 11. The configuration of the present invention in FIG. 11 includes the prediction method judgment unit 33, a frequency component extraction unit 41, and a frequency component considering prediction value calculation unit 42. And 43 denotes a prediction value calculation unit 43 of the conventional method.

The prediction method judgment unit 33 receives, as an input, information on a prediction direction (w) included in encoded data. The prediction method judgment unit 33 judges whether the prediction direction performs the prediction according to the conventional method or prediction of the method according to the present invention and then controls a prediction value calculation method.

The frequency component extraction unit 41 receives, as inputs, a pixel value (v) of a decoded MB adjacent to a process MB and the prediction direction (w). According to the prediction direction (w), the pixel value (v) of the decoded MB is allowed to be a one-dimensional numerical value array to determine an alternating current frequency component of the numerical value array by orthogonal conversion. The frequency component extraction unit 41 outputs a frequency component (y).

The frequency component-considering prediction value calculation unit 42 receives, as inputs, the pixel value of the decoded adjacent MB, a prediction direction included in encoding information, and the alternating current frequency component (y) determined by the frequency component extraction unit 41. The frequency component-considering prediction value calculation unit 42 uses the pixel value of the decoded pixel adjacent to the process MB as a direct current component to generate the prediction value (p) in the process MB according to the input alternating current frequency component and prediction direction. The prediction value calculation unit 42 generates and outputs the prediction values p(i) of all pixels in the process MB. The processes of the frequency component extraction unit 41 and the frequency component-considering prediction value calculation unit 42 are the same as those of the frequency component extraction unit 22 and the frequency component-considering prediction value calculation unit 23 of FIG. 2 respectively.

Another embodiment of the present invention will be described below. In this embodiment, the pixel value array X in an encoded MB is directly used as a prediction value to generate the prediction value p(i). A block diagram of the prediction value calculation process of the encoder and the decoder is shown below. This process is a special case of the process shown in FIGS. 1 and 2 and is included in FIGS. 1 and 2. Specifically, when the prediction value array p(i) is generated, a DC component is used as a value based on an average value of pixel values included in and an AC component t'(i) is used as the pixel value array X, which is included in FIGS. 1 and 2.

Figure 12:
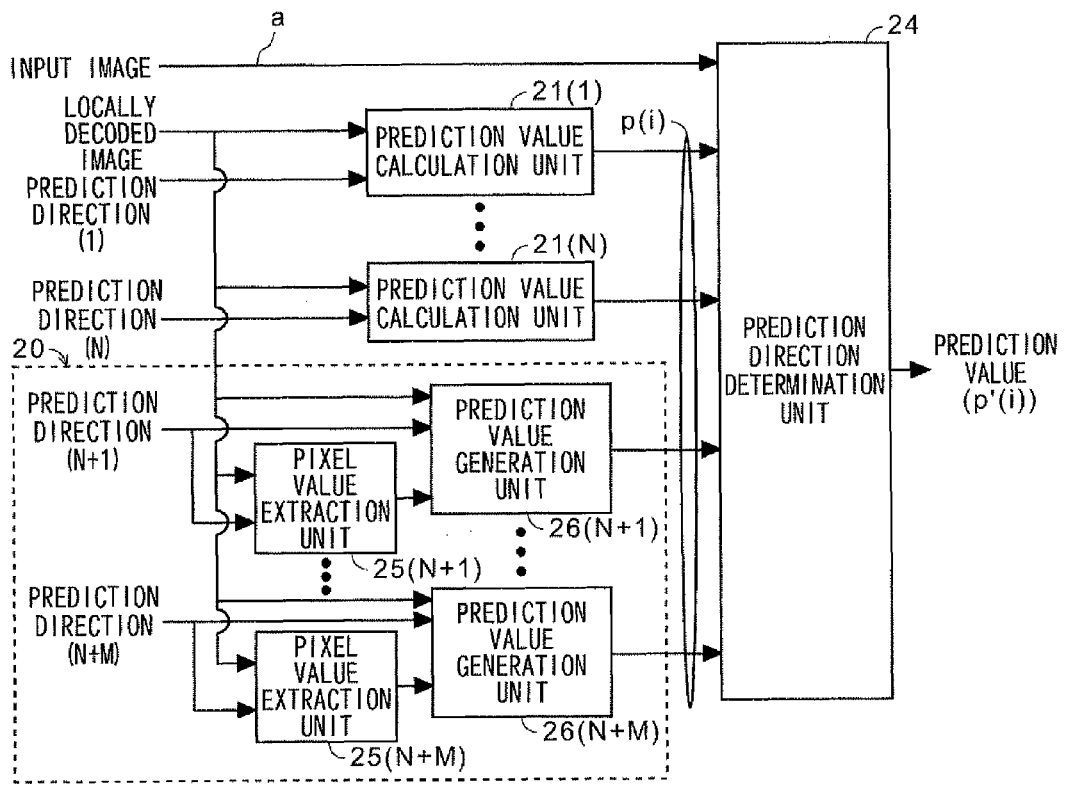
FIG. 12 is a block diagram showing the configuration of the intra prediction unit of another embodiment of the present invention.
Figure 16A:
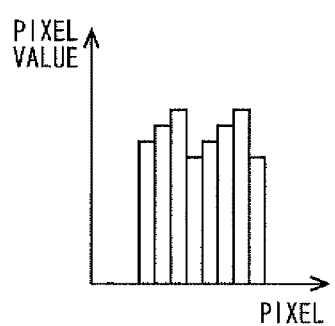
FIGS. 16A to 16C are explanatory views of the conventional method and the method according to the present invention of residual signals in a pattern including periodic texture.
Figure 16B:
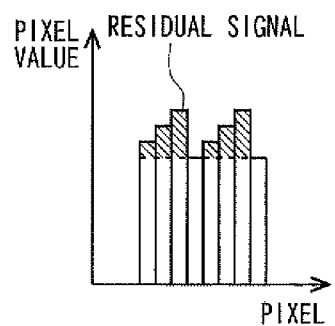
Figure 16C:
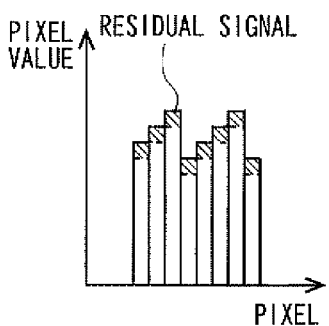

FIG. 12 is a block diagram showing the prediction value calculation process of the encoder. The same reference numerals as FIG. 2 indicate identical or equivalent ones. A prediction value calculation unit 20' of the present invention includes pixel value extraction units 25(N+1) to 25(N+M) and prediction value generation units 26 (N+1) to 26 (N+M). The pixel value extraction unit 25 has, as inputs, a pixel value of an encoded adjacent ME and one of predetermined prediction directions. The pixel value of the encoded MB is used as a one-dimensional numerical value array according to the prediction direction. The prediction value generation unit 26 receives, as inputs, one of predetermined prediction directions and the pixel value array output from the pixel value extraction unit 25. The prediction direction input to the prediction value generation unit 26 and the prediction direction input to the pixel value extraction unit 25 are the same. The prediction value generation unit 26 directly uses the pixel value array output from the pixel value extraction unit 25 as a prediction value in a process MB. The prediction value generation unit 26 outputs the prediction value.

The input image (a) and the prediction values p(i) are input to the prediction direction determination unit 24 from the conventional prediction value calculation units 21(1) to 21(N), and the prediction value calculation unit 20' according to the present invention. The prediction direction determination unit 24 determines the difference between the prediction value and the input image (original image) to generate a residual signal, estimates encoding efficiency in the prediction directions from the amount of encoding of the prediction value and the magnitude of the residual signal, and outputs the prediction value in the prediction direction having the highest encoding efficiency as the prediction value p'(i) of intra encoding in a process MB. As the method of estimating encoding efficiency from the amount of encoding and the residual signal to determine a prediction direction having good encoding efficiency, the existing technique is used.

FIG. 13 is a block diagram showing a prediction value calculation process of the decoder. The same reference numerals as FIG. 11 indicate identical or equivalent ones. The prediction value calculating process includes the prediction method judgment unit 33, a pixel value extraction unit 44, and a prediction value generation unit 45. The prediction method judgment unit 33 receives, as an input, information on a prediction direction included in encoded data. The prediction method judgment unit 33 judges whether the prediction direction performs prediction according to the conventional method or prediction of the method according to the present invention and controls the prediction value calculation method. The pixel value extraction unit 44 receives, as inputs, a pixel value of a decoded MB adjacent to a process MB and a prediction direction. The pixel value of the decoded MB is used as a one-dimensional numerical value array according to the prediction direction. The pixel value extraction unit 44 outputs the pixel value array. The prediction value generation unit 45 receives, as inputs, the pixel value of the decoded adjacent MB, the prediction direction included in encoding information, and the pixel value array as the output of the pixel value extraction unit 44. The prediction value generation unit 45 uses the pixel value array out put from the pixel value extraction unit 44 as a prediction value in the process ME. The prediction value generation unit 45 outputs the prediction value, In the present invention, high prediction performance can be expected in (1) a pattern including gradation representation and (2) an image in a pattern including periodic texture. With respect to images in these patterns, the effect of generating a prediction value by considering a frequency component in prediction in the horizontal direction will be described below.

FIG. 14 shows a process MB in the region of a pattern having the (1) or (2) feature and an encoded adjacent MB on the left side of the process ME.

FIGS. 15A to 15C show prediction in the horizontal direction in the mth line when the MB of FIG. 14 has a pattern having the (1) feature. FIG. 15A shows pixel values of the locally decoded result in the encoded MB. FIG. 15B shows residual signals when the conventional method not considering a frequency component is used for the pixel value of an original image. FIG. 15C shows residual signals when the method according to the present invention is used for the pixel value of the original image.

As in FIGS. 15A to 15C, FIGS. 16A to 16C show prediction in the horizontal direction in the mth line when the MB of FIG. 14 has a pattern having the (2) feature. From FIGS. 15A to 16C, it is found that occurrence of the residual signals is prevented in the images in the patterns including the (1) and (2) features by the method according to the present invention. Improvement of encoding efficiency is found to be expected by the method according to the present invention.

The description of FIGS. 14 to 16C represents the effect of prediction value generation in the encoder. The prediction value generating process in the decoder is equivalent to the process on the case that an encoded MB in the encoder is replaced with a decoded MB. The decoder can obtain the effect equivalent to that shown in FIGS. 14 to 16C.

What is claimed is:

1. An intra prediction system of a video encoder which allows intra encoding when each macro block is encoded, comprising:

a frequency component extraction unit having, as inputs, a pixel value array of an encoded adjacent macro block and a prediction direction for extracting a portion or all of an alternating current frequency component of an orthogonal conversion coefficient, the orthogonal conversion coefficient is obtained by a pixel value included in the pixel value array of the encoded adjacent macro block along the prediction direction and made one-dimensional, then subjected to a one-dimensional orthogonal conversion; and a prediction value calculation unit having, as inputs, the pixel value array of the encoded adjacent macro block, the prediction direction, and the alternating frequency component outputted from the frequency component extraction unit for generating a prediction value using the orthogonal conversion coefficient which comprises a direct current frequency component equivalent to the pixel value or an average value of two or more pixel values included in the pixel value array of the encoded adjacent macro block and the alternating current frequency components outputted from the frequency component extraction unit subjected to an inverted orthogonal conversion.

2. An intra prediction system of a video decoder which decodes encoded data generated by the video encoder comprising:

a prediction method judgment unit for detecting information on an intra prediction;

a frequency component extraction unit having, as inputs, a pixel value array of a decoded macro block adjacent to a processed macro block and a prediction direction for extracting alternating current frequency components of a numerical array, wherein the numerical array is obtained by a pixel value of the decoded macro block along the prediction direction and is made one-dimensional, then subjected to a one-dimensional orthogonal conversion; and a prediction value calculation unit having, as inputs, the pixel value array of the decoded macro block adjacent to the processed macro block, the prediction direction, and the alternating current frequency components from the frequency component extraction unit for outputting a prediction value of the processed macro block along the prediction direction, the prediction value is generated by the pixel value or the average value of two or more pixel values included in the pixel value array along the prediction direction of the decoded adjacent macro block used as a DC component and the alternating current frequency components from the frequency component extraction unit are used as the alternating current components.

3. The intra prediction system of the video encoder according to claim 1, wherein the prediction direction is at least one of a horizontal direction, a vertical direction, a diagonal-right direction, a diagonal-left direction, a vertical-right direction, a vertical-left direction, a horizontal-up direction, and a horizontal-down direction.

4. The intra prediction system of the video decoder according to claim 2, wherein the prediction direction is at least one of a horizontal direction, a vertical direction, a diagonal-right direction, a diagonal-left direction, a vertical-right direction, a vertical-left direction, a horizontal-up direction, and a horizontal-down direction.

5. The intra prediction system of the video encoder according to claim 1, wherein the pixel value is a brightness value, color difference, or RGB signals.

6. The intra prediction system of the video decoder according to claim 2, wherein the pixel value is a brightness value, color difference, or RGB signals.

* * * * *